US007773558B2

(12) United States Patent
Cho et al.

(10) Patent No.: US 7,773,558 B2
(45) Date of Patent: Aug. 10, 2010

(54) WIRELESS NETWORK CHANNEL ALLOCATION METHOD AND MULTI-HOP WIRELESS NETWORK SYSTEM USING THE SAME

(75) Inventors: Seongho Cho, Seoul (KR); Chong-kwon Kim, Seoul (KR)

(73) Assignee: Seoul National University Industry Foundation (KR)

( * ) Notice: Subject to any disclaimer, the term of this patent is extended or adjusted under 35 U.S.C. 154(b) by 703 days.

(21) Appl. No.: 11/673,886

(22) Filed: Feb. 12, 2007

(65) Prior Publication Data

US 2008/0151821 A1 Jun. 26, 2008

(30) Foreign Application Priority Data

Dec. 26, 2006 (KR) .................. 10-2006-0133943

(51) Int. Cl.
*H04W 4/00* (2009.01)
(52) U.S. Cl. ...................... 370/329; 370/341
(58) Field of Classification Search ............. 455/432.1, 455/453.1, 450–455, 41.2–41.3, 501, 63.1, 455/67.13; 370/322, 329, 339, 341
See application file for complete search history.

(56) References Cited

U.S. PATENT DOCUMENTS

| 7,027,827 | B2* | 4/2006 | Bonta et al. | 455/502 |
| 7,054,644 | B2* | 5/2006 | Heubel | 455/454 |
| 7,251,224 | B2* | 7/2007 | Ades et al. | 370/330 |
| 7,286,489 | B2* | 10/2007 | Ades | 370/254 |
| 7,440,436 | B2* | 10/2008 | Cheng et al. | 370/338 |
| 2002/0042274 | A1* | 4/2002 | Ades | 455/445 |
| 2002/0044537 | A1* | 4/2002 | Ades et al. | 370/330 |
| 2003/0161268 | A1* | 8/2003 | Larsson et al. | 370/229 |
| 2005/0192037 | A1* | 9/2005 | Nanda et al. | 455/509 |
| 2006/0217067 | A1* | 9/2006 | Helbig | 455/63.1 |
| 2006/0268791 | A1* | 11/2006 | Cheng et al. | 370/338 |
| 2006/0281467 | A1* | 12/2006 | Kim et al. | 455/450 |

(Continued)

OTHER PUBLICATIONS

Cooperation in Ad-Hoc Networks; Wireless Multihop Networks from Theory to Practice, Mahonen et al., pp. 189-222, Jul. 25, 2006, published by: Springer Netherlands, ISBN: 978-1-4020-4710-7 (Print) 978-1-4020-4711-7 (online).*

(Continued)

*Primary Examiner*—Lewis G West
*Assistant Examiner*—Nathan Taylor
(74) *Attorney, Agent, or Firm*—Cantor Colburn LLP

(57) ABSTRACT

Multi-hop wireless networks have benefits in coverage extension and throughput improvement. In this multi-hop wireless networks, multiple channels are available to improve system performance through concurrent transmission. In this invention, a multi-channel assignment method is described. For efficient utilization of multiple channels considering different channel condition at each node, the multi-channel assignment method is comprising the steps of: a) gathering neighbor relay node information by relaying control messages which include node information, such as the list of neighbor nodes, the preferable channel list of nodes, and the number of available radio interfaces; b) connectivity graph construction, by generating the multi-graph connectivity graph from the gathered node information; c) conflict graph composition, by generating the multi-channel conflict graph which exhibits interference among links from the multi-graph connectivity graph; and d) multi-channel assignment, by allocating channels to links considering channel interference by referring the multi-channel conflict graph using the list coloring algorithm.

13 Claims, 7 Drawing Sheets

U.S. PATENT DOCUMENTS

| | | | |
|---|---|---|---|
| 2007/0002794 A1* | 1/2007 | Demirhan et al. | 370/329 |
| 2007/0070937 A1* | 3/2007 | Demirhan et al. | 370/328 |
| 2007/0147248 A1* | 6/2007 | Kodialam et al. | 370/235 |
| 2007/0189191 A1* | 8/2007 | Ades | 370/254 |
| 2007/0280153 A1* | 12/2007 | Sinha | 370/328 |
| 2008/0268855 A1* | 10/2008 | Hanuni et al. | 455/445 |
| 2009/0003306 A1* | 1/2009 | Plutov et al. | 370/348 |
| 2009/0059815 A1* | 3/2009 | Cheng et al. | 370/254 |
| 2009/0059855 A1* | 3/2009 | Nanda et al. | 370/329 |
| 2009/0175238 A1* | 7/2009 | Jetcheva et al. | 370/329 |

OTHER PUBLICATIONS

Weighted Coloring based channel assignment for WLAns, Mishra et al., ACM SIGMOBILE Mobile Computing and Communications Review vol. 9 Issue 3 (Jul. 2005) pp. 19-31 ISSN: 1559-1662.*

Gandham, S., Dawande, M., and Prakash, R. (2005). Link Scheduling in Sensor Networks: Distributed Edge Coloring Revisted. In Proc. of IEEE INFOCOM' 05.*

Br'elaz, D. (1979). New methods to color the vertices of a graph. Communications of the ACM, 22:251-256.*

* cited by examiner

Multi-channel Conflict Graph(G)

Sub-graph(G₁)  Sub-graph(G₂)  Sub-graph(G₃)

a) multi-channel assignment
result of Sub-graph list
coloring algorithm b) multi-channel assignment
result of k-GL algorithm

WIRELESS NETWORK CHANNEL ALLOCATION METHOD AND MULTI-HOP WIRELESS NETWORK SYSTEM USING THE SAME

BACKGROUND OF THE INVENTION

1. Field of the Invention

The present invention relates to a multi-channel assignment method in multi-hop wireless networks for the nodes with multiple wireless transceivers to utilize multiple non-orthogonal channels, and a more particularly to a dynamic multi-channel assignment method in multi-hop wireless networks, such as wireless mesh networks and wireless ad-hoc networks, for the relay nodes to improve the system throughput by concurrent transmission with multiple non-orthogonal channels.

2. Description of the Related Art

A Multi-hop wireless network has received interest, in the research of extending the reach of last-mile access to the Internet, using multi-hop configuration. The typical examples of multi-hop wireless networks are wireless mesh networks and wireless ad-hoc networks. This multi-hop wireless network consists of wireless relay nodes and subscribed nodes. A wireless relay node relays packets like a router in a fixed network through wireless channels. Some relay nodes are connected to the Internet and all subscribed nodes can access the Internet through multi-hop relaying. Considering that the main cost of wired networks is the deployment and maintenance of physical wires, multi-hop wireless networks are beneficial for swift deployment, low installation costs, and higher flexibility.

Typical examples of multi-hop wireless networks can be found in standardization activities. The WLAN (IEEE 802.11) and WIMAX (IEEE 802.16) technologies tackle wireless mesh networks. In IEEE 802.11, ESS (Extended Service Set) Mesh Networking (IEEE 802.11s) TG (Task Group) considers layer-2 mesh path selection and data forwarding for Mesh AP (Access Point)s. Mesh APs create a wireless backhaul network and provide Internet access service for the served nodes. Also, the WiMax standard and Multi-hop Relay (IEEE 802.16a/j) TG deal with multi-hop transmission to expand the coverage and improve the system throughput.

In this multi-hop wireless network, non-overlapping channels can be used to improve the system performance via simultaneous transmission within a neighborhood. For example, 3and 12 non-overlapping channels are available in the IEEE 802.11b/g and 802.11a standard, respectively. Also, multiple radio interfaces are feasible in a single relay node since the prices of RF transceivers have gone down. For example, some products equipped with multiple radios have been commercially merchandized.

In this multi-radio multi-channel wireless network, the channel allocation method affects system performance. Multiple channels should be allocated to minimize interference among channels. Channel interference in multi-hop configuration has three factors. First, each node experiences different channel interference. Due to the fading effect of wireless channels, each node has different channel quality, according to its location and environment. Therefore, each node can prefer different channels by its noise level. Second, neighboring paths that use the same channel interfere with each other. When two paths use the same channel within an interference range, two flows cannot be transmitted simultaneously. This interference is the inter-flow interference. Third, there exists interference among adjacent hops on the same path. If consecutive links of path within the interfering range are allocated with the same channel, packets that belong to a flow cannot be transmitted simultaneously on consecutive links. This is the intra-flow interference. To maximize network throughput, the above channel interference should be considered in a multi-channel assignment problem.

SUMMARY OF THE INVENTION

Therefore, the present invention has been made in view of the above problems, and it is an object of the invention to provide a dynamic multi-channel assignment method for acquiring throughput improvement via concurrent transmission in a multi-hop wireless network.

In accordance with one aspect of the present invention, these objects are accomplished by providing a dynamic channel assignment method to utilize multiple non-overlapping channels with multiple radio interfaces considering different channel condition at each node for acquiring maximized multiple channel utilization in multi-hop wireless networks comprising the steps of: a) gathering neighbor relay node information to the central nodes, by relaying control messages which include node information, such as the list of neighbor nodes, the preferable channel list of nodes, and the number of available radio interfaces; b) connectivity graph construction, by generating the multi-graph connectivity graph from the gathered node information; c) conflict graph composition, by generating the multi-channel conflict graph which exhibits interference among links from the multi-graph connectivity graph; and d) multi-channel assigning, by allocating channels to the links considering channel interference by referring the multi-channel conflict graph; which consists of e) preferable channel extractions; f) a multiple channel allocation process; and g) distribution, by transmitting the assigned channel result to the relay nodes.

Preferably, a relay node measures the RSS (Received Signal Strength). From the RSS measurement, a node can obtain the background noise strength of each channel. And each node exchanges control messages which include node information, such as neighbor information, channel lists and channel assignment results. This preferable channel lists are collected by a central node (here, the central node would be the node with the Internet connection) From the collected channel lists and network topology, a central node assigns channels to each link and broadcasts the channel assignment results.

Preferably, from gathered relay node information, a multi-graph connectivity graph is constructed A multi-graph is a graph which can have multiple edges between two nodes, as opposed to a simple graph with only one edge between two nodes. We model the multi-hop wireless network after an undirected multi-graph, $G=\{V, E\}$. A vertex and edge are a node and link in a multi-hop wireless network, respectively. If both nodes assign an available radio to their neighbor nodes, then an edge is created. Therefore, the number of assigned radios to neighbor node determines the number of edges. Here, the radio assignment problem should be resolved. To make channel allocation fair and to ensure connectivity, the max-min allocation method is used. Given the number of radios, Q, and the number of neighbor nodes, N, if Q<N, then select Q neighbor nodes from N nodes and assign Q radios to the selected neighbor nodes. If $Q \geqq N$, then N radios are allocated to all nodes and the Q–N radios are allocated to nodes that repetitively have available radios.

Preferably, from the multi-graph connectivity graph, a multi-channel conflict graph $G'=\{V', E'\}$ can be generated to express the interfering relationship among links. In a multi-channel conflict graph, a vertex corresponds to an edge in the multi-graph connectivity graph. And an edge exists between interfering links in the multi-graph connectivity graph. An interfering link is defined as follows: If edge e' shares a node with edge e, e' is a node sharing interfering edge; or if any node of edge e' can hear the transmission from edge e, e' is an overhearing interfering edge.

Preferably, by applying the list coloring algorithm to the multi-channel conflict graph, non-overlapping channel allocation results can be obtained. To allocate multiple channels not to conflict, the list coloring algorithm is used. The present invention proposes a new sub-graph list coloring algorithm, named a sub-graph list coloring algorithm, to reduce the number of overlapped colors.

Preferably, a dynamic channel assignment method to utilize multiple non-overlapping channels with multiple radio interfaces considering different channel condition at each node for acquiring maximized multiple channel utilization in multi-hop wireless networks comprises the steps of: S101) gathering neighbor relay node information to the central nodes, by exchanging a HELLO message which includes node information, such as the list of neighbor nodes, the preferable channel list of nodes, and the number of available radio interfaces; S103) connectivity graph construction, by generating the multi-graph connectivity graph from the gathered node information; S105) conflict graph composition, by generating the multi-channel conflict graph which exhibits interference among links from the multi-graph connectivity graph; S109) preferable channel extractions from the gathered node information; S111) sub-graph generation from the multi-channel conflict graph to allocate multiple channels not to be overlapped; S113) multi-channel assignment, by allocating channels to the links with the list coloring algorithm considering channel interference by referring the multi-channel conflict graph; and S115) distribution, by transmitting the assigned channel result to the relay nodes.

BRIEF DESCRIPTION OF THE DRAWINGS

The above objects, and other features and advantages of the present invention will become more apparent after reading the following detailed description when taken in conjunction with the drawings, in which.

DESCRIPTION OF THE PREFERRED EMBODIMENTS

Figure 1:
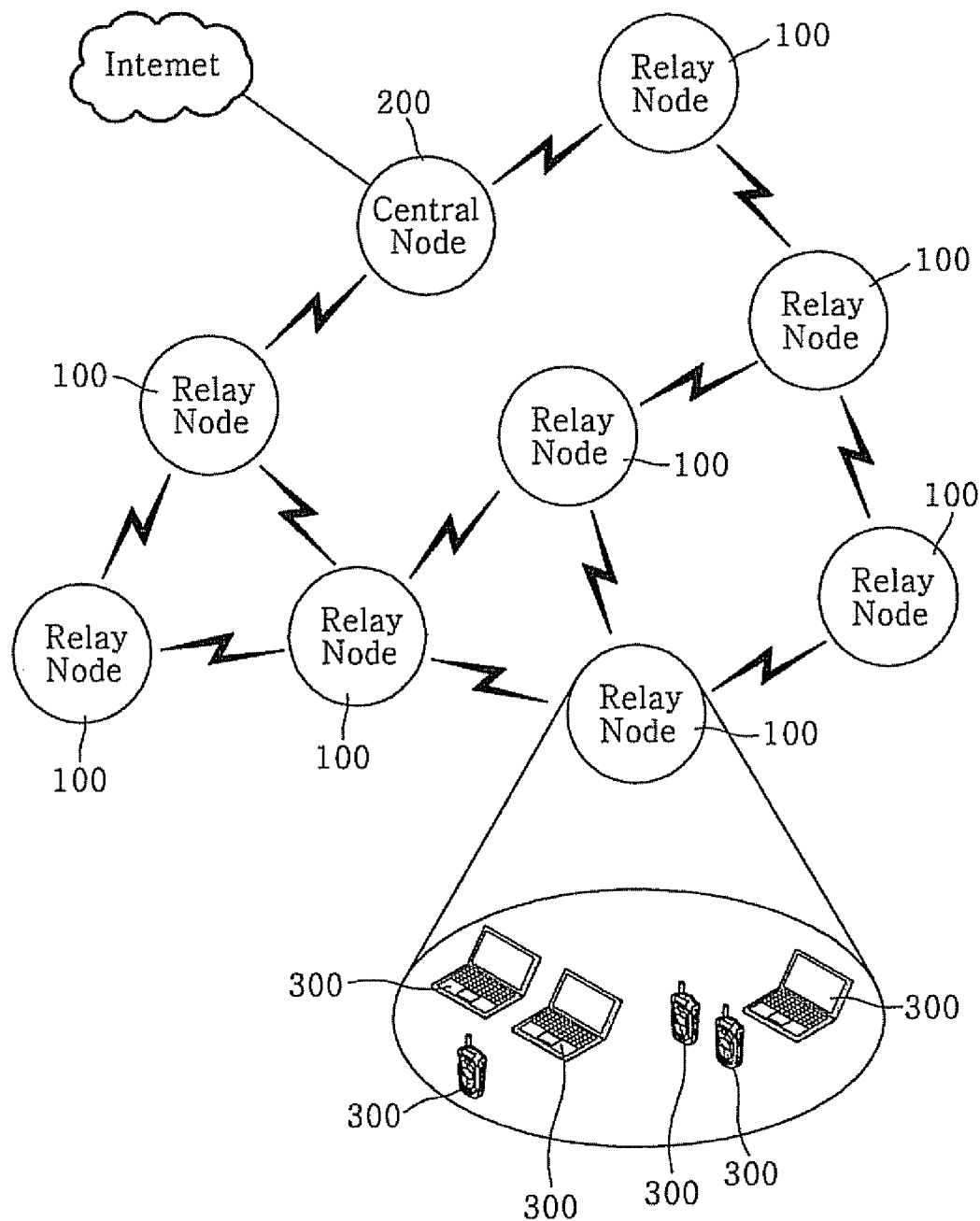
FIG. 1 is a graph illustrating a multi-hop wireless network which consists of relay nodes and a relay node with the Internet connection.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

FIG. 1 is a graph illustrating a multi-hop wireless network.

Referring to FIG. 1, a multi-hop wireless network consists of relay nodes and subscribed nodes. A wireless relay node (100) forwards packets like a router in a fixed network through wireless channels. Some relay nodes (200) are connected to the Internet and all subscribed nodes (300) can access the Internet through multi-hop relaying via relay nodes.

Figure 2:
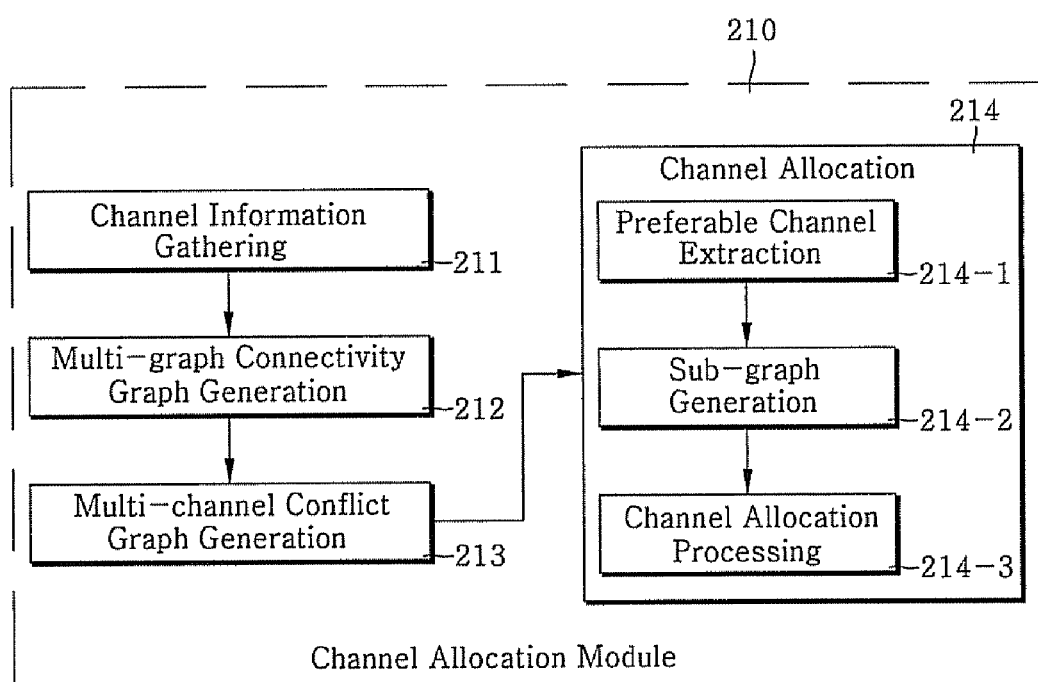
FIG. 2 is a conceptual diagram illustrating a multi-channel assignment module of a central node which has the Internet connection.

FIG. 2 is a conceptual diagram illustrating a multi-channel assignment module of a central node which has the Internet connection.

Referring to FIG. 2, a dynamic channel assignment method to utilize multiple non-overlapping channels with multiple radio interfaces considering different channel condition at each node for acquiring maximized multiple channel utilization in multi-hop wireless networks comprises the steps of: 211) gathering neighbor relay node information to the central nodes, by exchanging a HELLO message which includes node information, such as the list of neighbor nodes, the preferable channel list of nodes, and the number of available radio interfaces; 212) connectivity graph construction, by generating the multi-graph connectivity graph from the gathered node information; 213) conflict graph composition, by generating the multi-channel conflict graph which exhibits interference among links from the multi-graph connectivity graph; and 214) multi-channel assignment, by allocating channels to the links considering channel interference by referring the multi-channel conflict graph; which consists of 214-1) preferable channel extractions; 214-2) a multiple channel allocation process; and 214-3) distribution, by transmitting the assigned channel result to the relay nodes.

A relay node measures the RSS (Received Signal Strength). Each node switches the radio to each channel and measures the RSS. From the RSS measurement, a node can obtain the background noise strength of each channel. To measure channel quality, a radio switches among channels with a switching overhead. The delay in switching channels has been reported as tens of microseconds. This delay in switching is quite long compared to packet transmission time. However, when it comes to the long-term measurement, the delay can be neglected. Also, if a radio interface is available during data transmission, a node can measure the RSS per channel without switching overhead. Each node measures the interference level of multiple channels and keeps the preferable channel lists. The system frame is composed of two periods: control period and operation period. During the control period, a default channel is used to exchange control messages which include node information, such as neighbor information, channel lists and channel assignment results. During the operation period, any channel including the default channel can be used for data transmission according to the result of the channel assignment. This preferable channel lists are collected by a central node (here, the central node would be the node with the Internet connection) during the control period. From the collected channel lists and network topology, a central node assigns channels to each link and broadcasts the channel assignment results. This control period is repeated and the default channel is used at this period.

Figure 3:
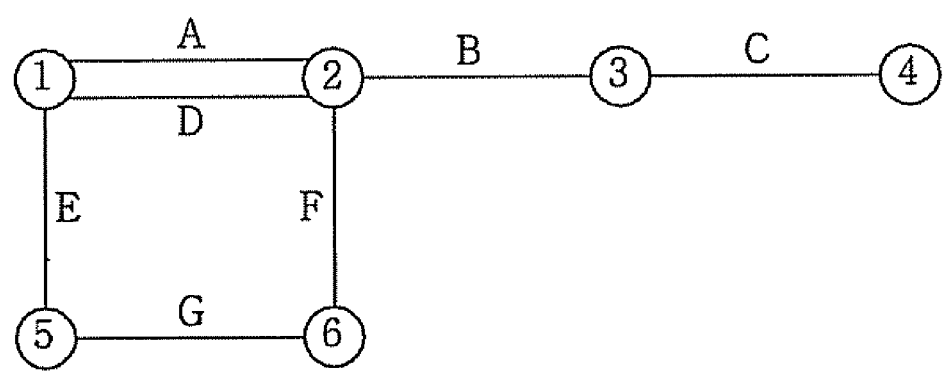
FIG. 3 shows a graph illustrating an example of a multi-graph connectivity graph.

From gathered relay node information, a multi-graph connectivity graph is constructed. A multi-graph is a graph which can have multiple edges between two nodes, as opposed to a simple graph with only one edge between two nodes. We model the multi-hop wireless network after an undirected multi-graph, $G=\{V, E\}$. A vertex and edge are a node and link in a multi-hop wireless network, respectively. If both nodes assign an available radio to their neighbor nodes, then an edge is created. Therefore, the number of assigned radios to neighbor node determines the number of edges. Here, the radio assignment problem should be resolved. To make channel allocation fair and to ensure connectivity, the max-min allocation method is used. Given the number of radios, Q, and the number of neighbor nodes, N, if Q<N, then select Q neighbor nodes from N nodes and assign Q radios to the selected neighbor nodes. If Q≧N, then N radios are allocated to all nodes and the Q−N radios are allocated to nodes that repetitively have available radios. An example of multi-graph connectivity graph is shown in FIG. 3.

Figure 4:
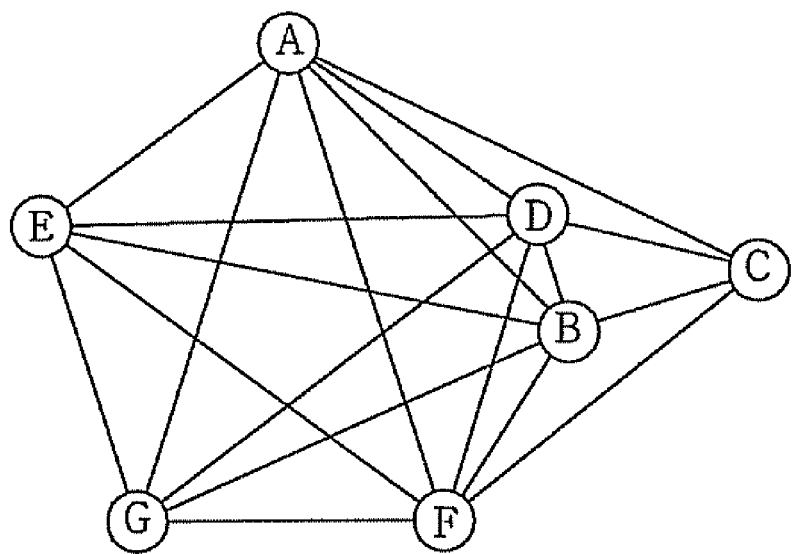
FIG. 4 shows a graph illustrating an example of a multi-channel conflict graph.

From the multi-graph connectivity graph, a multi-channel conflict graph $G'=\{V', E'\}$ can be generated. In a multi-channel conflict graph, a vertex corresponds to an edge in the multi-graph connectivity graph. And an edge exists between interfering links in the multi-graph connectivity graph. An interfering link is defined as follows: If edge e' shares a node with edge e, e' is a node sharing interfering edge; or if any node of edge e' can hear the transmission from edge e, e' is an overhearing interfering edge. An example of multi-channel conflict graph is shown in FIG. 4.

By applying the list coloring algorithm in the multi-channel conflict graph, non-overlapping channel allocation results can be obtained. To allocate multiple channels not to conflict, the list coloring algorithm is used.

To clarify the list coloring algorithm, the vertex coloring algorithm is previously described. The vertex coloring refers to the problem of assigning different colors to adjacent vertices. The coloring A of a graph $G=\{V, E\}$ is formally defined as function f: V→C such that $f(v) \neq f(w)$ if a vertex, v, is adjacent to another vertex, w. And, if the size of the color set, |C|, is the same as k and there exists a list coloring A, then a graph is to be k-colorable.

List coloring is a vertex coloring with the constraint of limited colors for each vertex. Given a color list $L(v) \subseteq C$ for each vertex v∈V, a graph G is list colorable if there exists a coloring A for which $f(v) \in L(v)$ for each v∈V. And, if the size of the color set, |L(v)|, is the same as k and there exists a list coloring A, then a graph is to be k-list colorable. Using this list coloring algorithm, the multi-channel allocation is obtained from the multi-channel conflict graph. For the multi-channel conflict graph, a vertex is a link in the multi-graph connectivity graph. Therefore, a color list in the multi-channel conflict graph is generated by merging color lists of two different nodes. The color list of a link can be the intersection or union of two color lists of two nodes.

However, since the list coloring problem is NP-hard, colors can be assigned by heuristic methods. The k-GL (k-Greedy List) algorithm is a known heuristic algorithm. A brief description of the k-GL algorithm is as follows: Initially, the vertex set, V, is sorted by the size of the assigned color list. Then, the vertex, v, with the smallest size of color list selected from V. If the color list size is greater than 0, assign a color, c, to the vertex, v, randomly chosen from L(v). And, for each vertex u∈V that is adjacent to the vertex v, the color list set, L(u), is updated by removing the color c. If the size of selected color list, |L(v)|, is 0, then the algorithm fails. Then, a randomly selected color is assigned to a node which is not allocated with colors during the algorithm.

The above k-GL algorithm is simple, but it is easy to fail in finding the results since the color list of neighboring nodes cannot be considered with random selection. Also, algorithm failure in the mid-operation causes inefficient channel assignment since the remaining nodes are not assigned.

The present invention proposes a new sub-graph list coloring algorithm, named a sub-graph list coloring algorithm, to reduce the number of overlapped colors. For the color i, a sub-graph $G_i=\{V_i, E_i\}$ is generated. The vertex, v, belongs to $V_i$ if and only if it belongs to V and the color i is the member of L(v). An edge connects two nodes in $V_i$ if and only if these two nodes are connected in the original graph G. For each sub-graph, nodes are incrementally sorted according to their link degrees in sub-graph $G_i$ for each color ($N_i$). The sorted node set, $N_i$, and the color is assigned to the nodes according to their link degrees incrementally. When a tie exists, the highest degree of node in the original graph, G, is selected. The color assigned vertex is removed from the node set $^\forall N_i$. Recursively, repeat the color assignment until it satisfies the condition (required numbers of colors) or until $^\forall N_i$ is empty. The algorithm description is shown as follows:

---
Sub-graph Coloring Algorithm
---
Initialize:
    Assign color list $L(v) \subseteq L$ for all $v \in V$
For each color $i \in L$
    1. make sub-graph $G_i = \{V_i, G_i\}$
    2. $U_i = V_i$, sort vertex set by its degree
For each color $i \in L$ with smallest $|V_i|$
    1. for all non-adjacent node $v \in V_i$,
        assign color i to v from min degree
    2. remove vertex v from each $V_k$, $k \neq i$

---

In case of list coloring failure, we need to allocate channels to minimize the overlapped links. If the k-GL algorithm fails to allocate channels, nodes in set U are allocated with a randomly selected channel in color list in each node. If no node satisfies the condition 2 (|L(v)|>0), the algorithm stops and channels are randomly selected. However, the sub-graph list coloring algorithm proceeds until all sub-graph vertex sets are empty.

Figure 5:
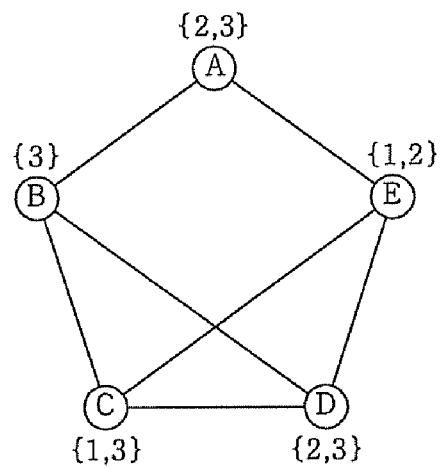
FIG. 5 is graphs illustrating an example of a sub-graph list coloring algorithm.
Figure 5:
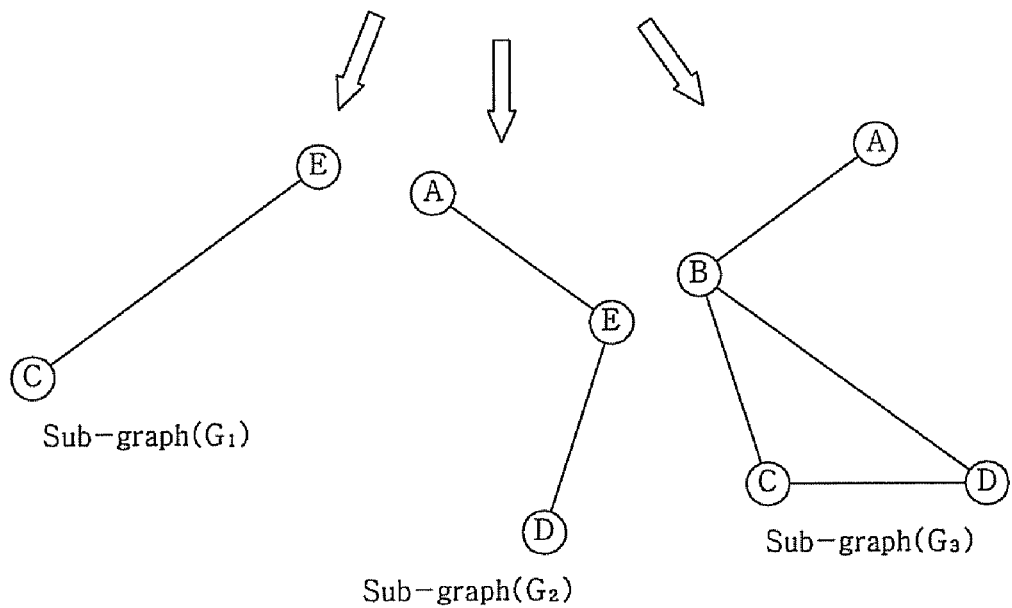
Figure 6:
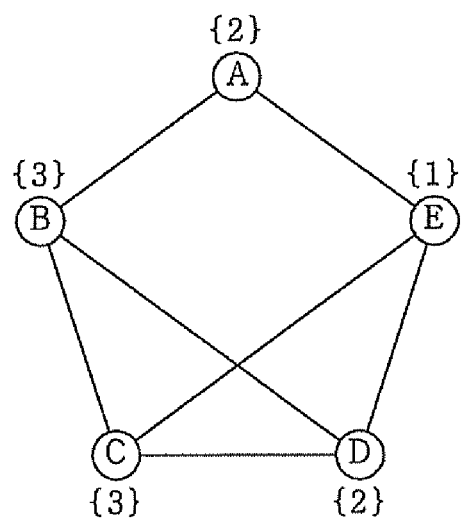
FIGS. 6 a) to b) are graphs illustrating the results of channel assignment by the sub-graph list coloring and k-GL algorithm.
Figure 6:
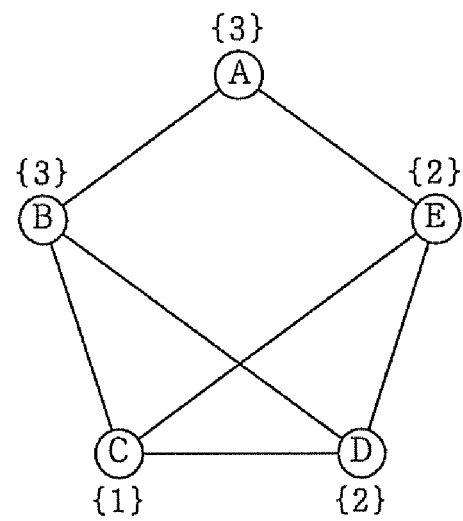

An example of list coloring algorithms is shown in FIG. 5 and FIG. 6. In this example, 5 nodes and 3 colors are used. For each color, a sub-graph is generated. This example is not list colorable. For the sub-graph list coloring algorithm, each sub-graph, $G_1$, $G_2$, and $G_3$, are generated. Since the number of nodes in $G_1$ is the smallest, set $G_1$ is first selected to assign colors. In sub-graph $G_1$, nodes C and E have the smallest number of edges and the maximum degree in original graph is the same. So, color 1 is assigned to the randomly selected node E. (The coloring result is same when node C is selected.) After color 1 assignment, node E is removed from $G_2$. And $G_2$ has the smallest number of nodes, and nodes A and D are assigned color 2 since there are no edges between nodes A and D. Also, nodes A and D are removed from $G_3$ and node C is assigned color 3. Here, node B is not assigned a color and any color in its color list is selected. In this example, node B is assigned color 3. The assignment results are shown in $G_{SLC}$, and colors {2, 3, 3, 2, 1} are assigned to nodes {A, B, C, D, E}, respectively.

Using the k-GL algorithm, node B is selected since it has the smallest size of color list. Color 3 is assigned to node B and color 3 is removed from L(A), L(C), and L(D). Since the sizes of color lists |L(A)|, |L(C)|, and |L(D)| are same, node C is assumed to be selected and assigned color 1. (The coloring result is similar when the other nodes are selected.) Similarly, color 1 is removed from L(E) and color 2 is assigned to node E which is randomly selected. In this case, L(A) and L(D) should remove color 2 and L(A) and L(D) is empty. So, the algorithm fails. If colors 3 and 2 are randomly selected to nodes A and D, then four nodes overlap each other. The node colors {3, 3, 1, 2, 2} are respectively assigned to nodes {A, B, C, D, E} as shown in $G_{k\text{-}GL}$. The color allocation results of Sub-graph List Coloring and k-GL algorithms are shown in FIG. 6 a) and b), respectively.

Figure 7:
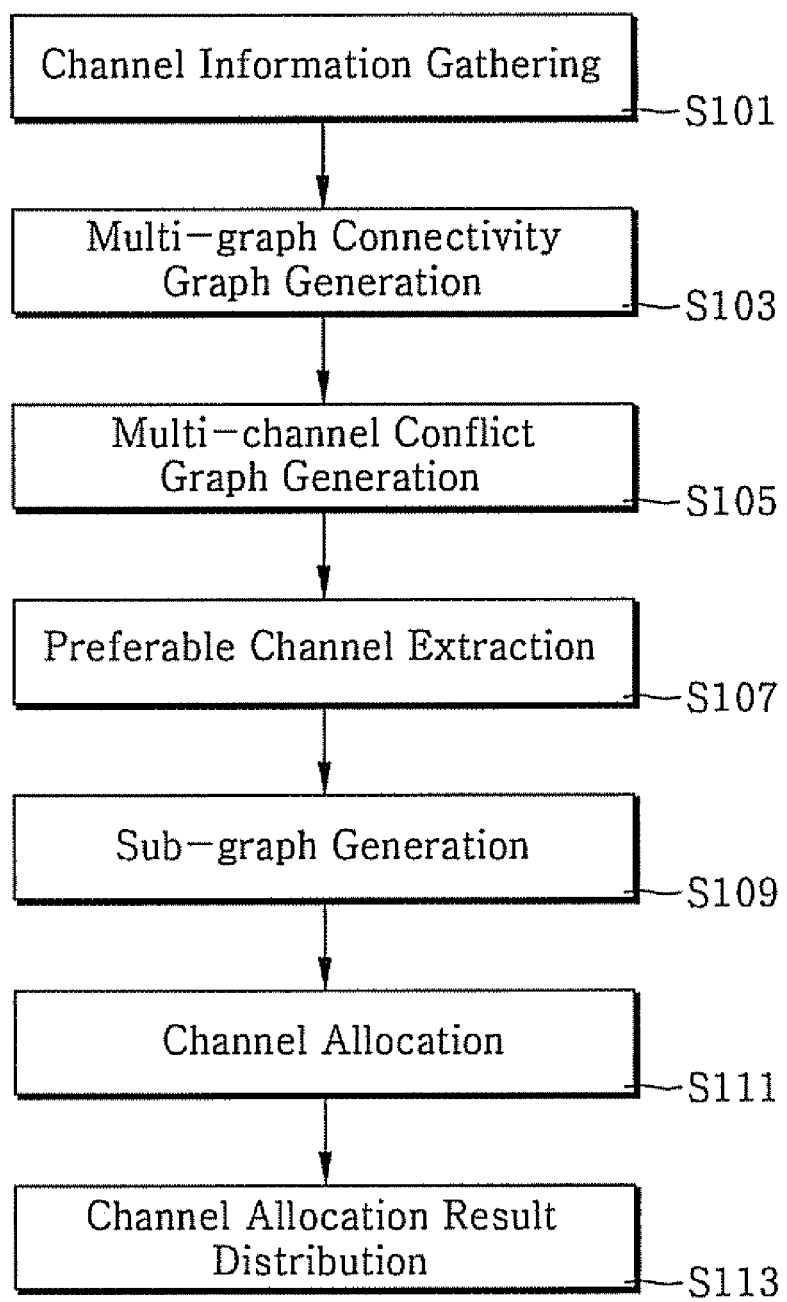
FIG. 7 is a flow chart illustrating a multi-channel assignment process in a multi-hop wireless network.

FIG. 7 is a flow chart illustrating a multi-channel assignment process in a multi-hop wireless network.

Referring to FIG. 7, a dynamic channel assignment method to utilize multiple non-overlapping channels with multiple radio interfaces considering different channel condition at each node for acquiring maximized multiple channel utilization in multi-hop wireless networks comprises the steps of: S101) gathering neighbor relay node information to the central nodes, by exchanging a HELLO message which includes node information, such as the list of neighbor nodes, the preferable channel list of nodes, and the number of available radio interfaces; S103) connectivity graph construction, by generating the multi-graph connectivity graph from the gathered node information; S105) conflict graph composition, by generating the multi-channel conflict graph which exhibits interference among links from the multi-graph connectivity graph; S109) preferable channel extractions from the gathered node information; S111) sub-graph generation from the multi-channel conflict graph to allocate multiple channels not to be overlapped; S113) multi-channel assignment, by allocating channels to the links with the list coloring algorithm considering channel interference by referring the multi-channel conflict graph; and S115) distribution, by transmitting the assigned channel result to the relay nodes.

What is claimed is:

1. A channel assignment method for a wireless network comprising:
   a) receiving or collecting node information including available channel information of individual nodes in a wireless network;
   b) calculating a multi-connection relationship of connection links among the individual nodes using the collected node information;
   c) calculating a channel conflict relationship caused by interference of the connection links among the individual nodes according to the calculated multi-connection relationship;
   d) assigning a channel to the connection links among the individual nodes by referring to the calculated channel conflict relationship; and
   e) transmitting the channel assigned to each link to the individual nodes,
   wherein the channel conflict relationship calculating step c) includes:
      c1) calculating all links, each of which includes interference for each node; and
      c2) generating a multi-channel conflict graph for a connection of the individual nodes by referring to the calculated links, and
   wherein the channel assigning step d) includes:
      d1) determining a preferable channel from among the available channels for each node, and extracting a preferable channel list from the available channels for each node;
      d2) extracting a specific node capable of adapting each of all the channels as a common preferable channel, and generating a sub-graph including only a node extracted from the multi-channel conflict graph;
      d3) assigning priority for each sub-graph; and
      d4) assigning a channel to the individual nodes contained in the sub-graph according to the assigned priority, deleting the channel-assigned node from other sub-graphs, and assigning the channel to connection links among the nodes.

2. The method according to claim 1, wherein the collecting step a) includes:
   receiving or collecting the node information by relaying data among the nodes.

3. The method according to claim 1, wherein the multi-connection relationship calculating step b) includes:
   generating a multi-graph equipped with multiple receivers capable of performing multiple transmission/reception among the nodes.

4. The method according to claim 1, wherein the channel conflict relationship calculating step c) includes:
   determining all the links sharing the nodes to be links, each of which causes the interference to a corresponding link.

5. The method according to claim 4, wherein the channel conflict relationship calculating step c) includes:
   determining a specific link as an interfering link when it satisfies one of the following conditions where an edge exists between interfering links:
      c1) if an edge e' shares a node with an edge e, then the edge e' is a node sharing interfering link; or
      c2) if any node of the edge e' can hear the transmission from the edge e, then the edge e' is an overhearing interfering link.

6. The method according to claim 1, wherein the priority is assigned in a descending numerical order of the number of nodes contained in the sub-graph.

7. The method according to claim 1, wherein the channel assigning step d) includes:
   indicating the same connection links on the sub-graph, selecting a node having more connection links from among the multi-channel conflict graph when two nodes are connected to each other, and assigning the channel to the selected node.

8. A multi-hop wireless network system comprising:
   one or more nodes, each of which includes available channel information equipped with preferable channel information, and provides corresponding channel information in the case of a channel assignment setup; and
   a central node including a channel assignment module, which is connected to an external network line including the Internet, forms a network along with a sub-router, and receives or collects channel information from the sub-router, thereby performing channel assignment,
   wherein the channel assignment module includes:
      a channel assignment unit for assigning a channel to the connection link among the individual nodes by referring to the multi-channel conflict graph generated by the multi-graph conflict graph generator;
      a channel information collector for receiving or collecting available channel information including preferable channel information from the node;
      a multi-graph generator for calculating a multi-connection link among the individual nodes using the collected available channel information received from the channel information collector, and generating a multi-graph using the calculated connection link; and
      a multi-channel conflict graph generator for calculating a channel conflict relationship caused by interference of the connection link among the individual nodes on the basis of the multi-graph received from the multi-graph generator, and generating a multi-channel conflict graph; and wherein the channel assignment unit includes:
- a preferable channel extractor for determining a preferable channel from among the available channels for each node, and extracting the preferable channel from the available channels for each node;
- a sub-graph generator for extracting a specific node capable of adapting the extracted preferable channel as a common preferable channel, and generating a sub-graph including only the node extracted from the multi-channel conflict graph; and
- a channel assignment processor for assigning priority for each sub-graph, assigning a channel to the individual nodes contained in the sub-graph according to the assigned priority, deleting the channel-assigned node from other sub-graphs, and assigning the channel to the connection link among the nodes.

9. The system according to claim 8, wherein the available channel information is received or collected by relaying data among the nodes.

10. The system according to claim 8, wherein the multi-channel conflict graph generator determines all the links sharing the nodes to be links, each of which causes interference to a corresponding link.

11. The system according to claim 10, wherein the multi-channel conflict graph generator determines a specific link including a node selected from among two nodes sharing the link to be an interference link, such that the selected node can communicate with an external node via the other node.

12. The system according to claim 8, wherein the priority is assigned in a descending numerical order of the number of nodes contained in the sub-graph.

13. The system according to claim 8, wherein the channel assignment unit indicates the same connection links on the sub-graph, selects a node having many more connection links from among the multi-channel conflict graph when two nodes are connected to each other, and assigns the channel to the selected node.

* * * * *